United States Patent
Nakamura

(10) Patent No.: US 9,324,001 B2
(45) Date of Patent: Apr. 26, 2016

(54) CHARACTER RECOGNITION DEVICE AND CHARACTER SEGMENTATION METHOD

(71) Applicant: NIDEC SANKYO CORPORATION, Suwa-gun, Nagano (JP)

(72) Inventor: Hiroshi Nakamura, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/674,480

(22) Filed: Mar. 31, 2015

(65) Prior Publication Data

US 2015/0278626 A1 Oct. 1, 2015

(30) Foreign Application Priority Data

Mar. 31, 2014 (JP) .................................. 2014-073451

(51) Int. Cl.
*G06K 9/34* (2006.01)
*G06K 9/46* (2006.01)

(52) U.S. Cl.
CPC .............. *G06K 9/344* (2013.01); *G06K 9/4609* (2013.01)

(58) Field of Classification Search
None
See application file for complete search history.

(56) References Cited

U.S. PATENT DOCUMENTS

2010/0135578 A1* 6/2010 Nakamura .................... 382/190

FOREIGN PATENT DOCUMENTS

JP 2008250754 A 10/2008

* cited by examiner

*Primary Examiner* — Andrew Moyer
(74) *Attorney, Agent, or Firm* — Cantor Colburn LLP

(57) ABSTRACT

A character recognition device for use with a medium with a character string, the character recognition device may include an image reader to capture the character string as image data; an image memory to store the image which is read by said image reader; and a data processor to segment the character string from said image data stored in said image memory and segmenting characters from said character string for character recognition. The data processor may include a character segmenting unit to detect boundary positions of neighboring characters in said character string and segment each character. The character segmenting unit may include a boundary search range setting unit to set a range to search boundary position of neighboring characters in said character string and a boundary position setting unit to set a boundary position of characters by using a discriminant analysis method within said search range which has been set.

6 Claims, 10 Drawing Sheets

FIG. 4
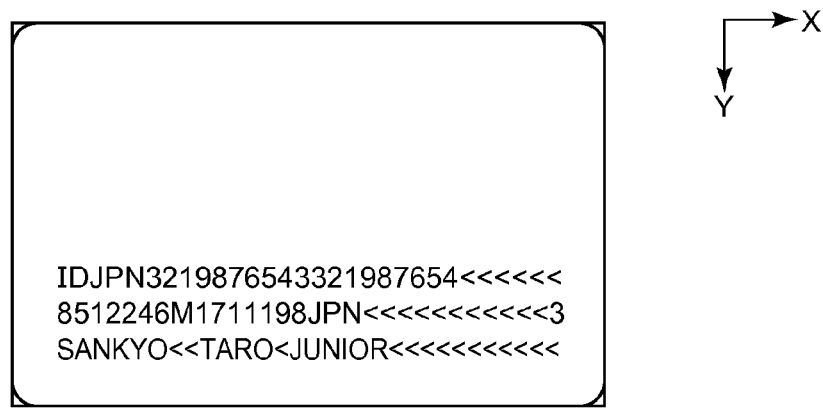
FIG. 5A
IDJPN3219876543321987654
FIG. 5B
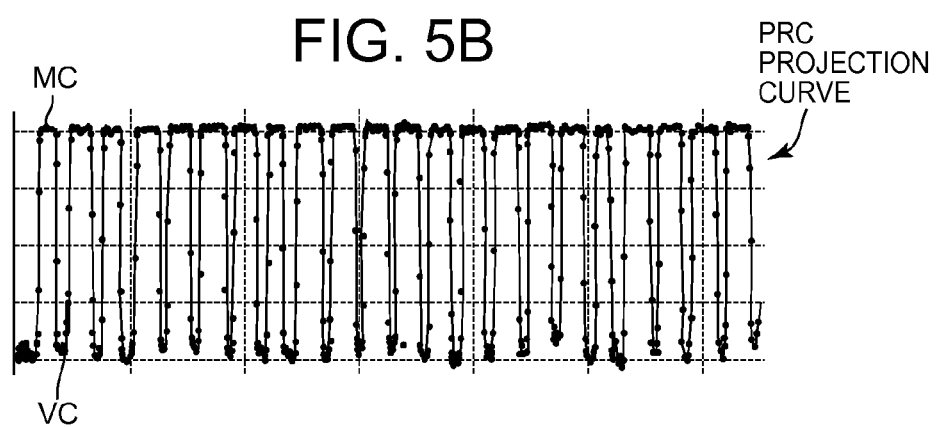

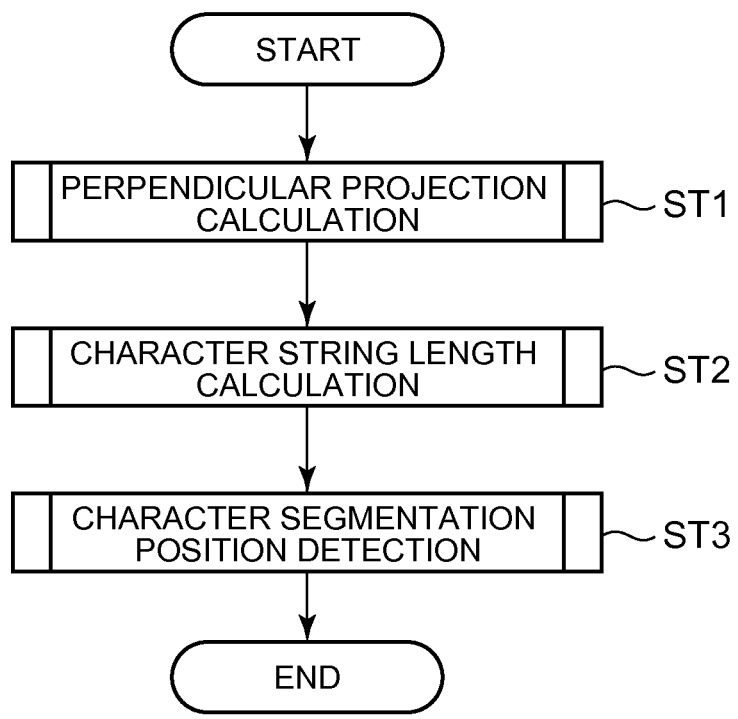

CHARACTER RECOGNITION DEVICE AND CHARACTER SEGMENTATION METHOD

CROSS REFERENCE TO RELATED APPLICATION

The present invention claims priority under 35 U.S.C. §119 to Japanese Application No. 2014-073451 filed Mar. 31, 2014, the entire contents of which are incorporated herein by reference.

FIELD OF TECHNOLOGY

The present invention relates to a character recognition technique which processes image data obtained by imaging a character string, and segments each character from the character string.

BACKGROUND

A character recognition technique is generally designed to specify the position of a character row (character string) segmentation and then to specify the segmentation position between characters in the character row (character string) whose position is determined (patent reference 1, for example).

FIG. 12 is a flowchart showing a process flow of a conventional character segmentation. In the character segmentation process (Step ST1 through ST3), a horizontal projection histogram is first calculated on a character line (character string). In this projection calculation, pixels in the vertical direction are added (or the arithmetic mean is calculated); the adding range is set in the range which has the top and bottom edges of the character line (character string) obtained by the character line (character string) segmentation unit, as its end points. With respect to the projection profile obtained in this way, the level value of the projection profile is compared with a predetermined threshold value slev (the method for setting a slev may adopt the method disclosed in patent reference 1), to judge the period exceeding the threshold slev as a space between characters. The boundary position is set at a midpoint between the both end points of the space.

PATENT REFERENCE

[Patent Reference 1] Unexamined Japanese Patent Application 2008-250754 Publication In the method of obtaining boundary positions in relation to a threshold, however, if noise is present locally on a projection curve due to image noise, the peak position of the noise may be mistaken as the boundary position.

In the character segmentation process disclosed in patent reference 1, as a character boundary detection process, a character string, which is a subject to recognition, is projected (in the direction orthogonal to the direction in which the character string is created) and a fixed threshold is provided. Through the comparison between the projection profile and the threshold, the boundaries between characters are acquired.

The method which uses comparison in relation to a threshold often finds a problem in how to set the threshold. This method works fine when characters are normal; however, when characters are locally illegible or connected due to noise, or the image resolution is degraded due to changes in the moving speed of a medium (the degraded modulation), problems can easily be caused, such as missing the character boundary depending on the level of the threshold and/or an error in detection of the character boundary position due to noise. Consequently, a stable recognition performance is hindered.

SUMMARY

At least an embodiment of the present invention provides a character recognition device capable of segmenting characters even when a threshold cannot be acquired accurately because characters are locally illegible or noise is present. Also, at least an embodiment of the present invention provides a character segmentation method for a character recognition device which is capable of segmenting characters even when a threshold cannot be acquired accurately because characters are locally illegible or noise is present.

At least an embodiment of the present invention may include a character recognition device for segmenting each character from a character string which is segmented from image data for character recognition, comprising an image reader which images a character string on a medium and reads it as image data, an image memory for storing the image read by the image reader, and a data processor which segments a character string from the image data stored in the image memory and segments characters from the character string for character recognition; wherein the data processor is equipped with a character segmentation unit which detects the boundary positions of neighboring characters in the character string and segments each character, and the character segmentation unit has a boundary search-range setting unit which sets a range to search a boundary position of neighboring characters in the character string and a boundary position setting unit which sets the boundary position of the characters by using a discrimination analysis method within the set search range. With this, the character segmentation is made possible even when a threshold cannot be acquired accurately because a character is locally illegible or noise is present.

It is preferred that the character segmenting unit include a projection curve creating unit which creates a projection curve from the image data based on the smallest luminance value of each pixel line arranged in the direction orthogonal to the direction of the character string in the image data, and that the boundary search range setting unit set the boundary search range by associating it with the projection curve. With this, the character section is clearly separated from the blank section, making it possible to determine a precise character segmenting position. Also, it is possible, without setting a threshold that affects the performance of character recognition, to determine the character boundary position with high accuracy regardless of the condition of the character boundary portion; consequently, the character recognition performance can be improved.

It is also preferred that the boundary position setting unit divide the projection to the boundary search range by a predetermined width into two regions, calculate a within-region variance in each of the two division regions, a between-region variance and a variance ratio between the within-region variance in each region and the between-region variance, and set the character segmentation position based on the calculated variance ratio. With this, the boundary position between neighboring characters can be determined without setting a threshold based on the level value of the projection curve; therefore, a boundary line can be set without implementing a complicated thresholding process even when the boundary is ambiguous.

It is preferred that the boundary search range setting unit set the boundary search range from one end of the character string, set the boundary position within the boundary search range set by the boundary position setting unit, and set the next boundary search range from the boundary position set in the boundary search range, and that the boundary position setting unit set a boundary position within every boundary search range which is set sequentially. With this, the local discrimination information can be obtained with high precision, making it possible to accurately determine the boundary positions of neighboring characters with high precision.

At least an embodiment of the present invention provides a character recognition device that segments each character from a character string segmented from the image data obtained by imaging a character string on a medium for character recognition, a character segmentation method for processing the image data to segment each character from the character string, comprising a character segmenting step which detects boundary positions of neighboring characters in the character string and segments each character, a boundary search range setting step which sets ranges in the character string to search the boundary positions of the neighboring characters, and a boundary position acquiring step which acquires the boundary position of the characters by using a discrimination analysis method within the search range. With this, the character segmentation can be implemented with certainty even when a threshold cannot be obtained accurately because a character is partially illegible or noise is present.

At least an embodiment of the present invention provides a character recognition device capable of segmenting characters even when a threshold cannot be obtained accurately due to partially illegible characters or the presence of noise. Also, at least an embodiment of the present invention provides a character segmentation method for a character recognition device capable of segmenting characters even when a threshold cannot be obtained accurately due to partially illegible characters or the presence of noise.

BRIEF DESCRIPTION OF THE DRAWING

Embodiments will now be described, by way of example only, with reference to the accompanying drawings which are meant to be exemplary, not limiting, and wherein like elements are numbered alike in several Figures, in which:

FIG. 4 is a figure showing an example of the image of a subject to character recognition of this embodiment.

FIGS. 5A and 5B are diagrams showing a character string in the image and an example of the projection curve corresponding to this character string.

FIG. 12 is a flowchart showing a conventional character segmentation process flow.

DETAILED DESCRIPTION

At least an embodiment of the present invention is described hereinafter corresponding to the drawings.
(Configuration of Character Recognition Device)

Figure 1:
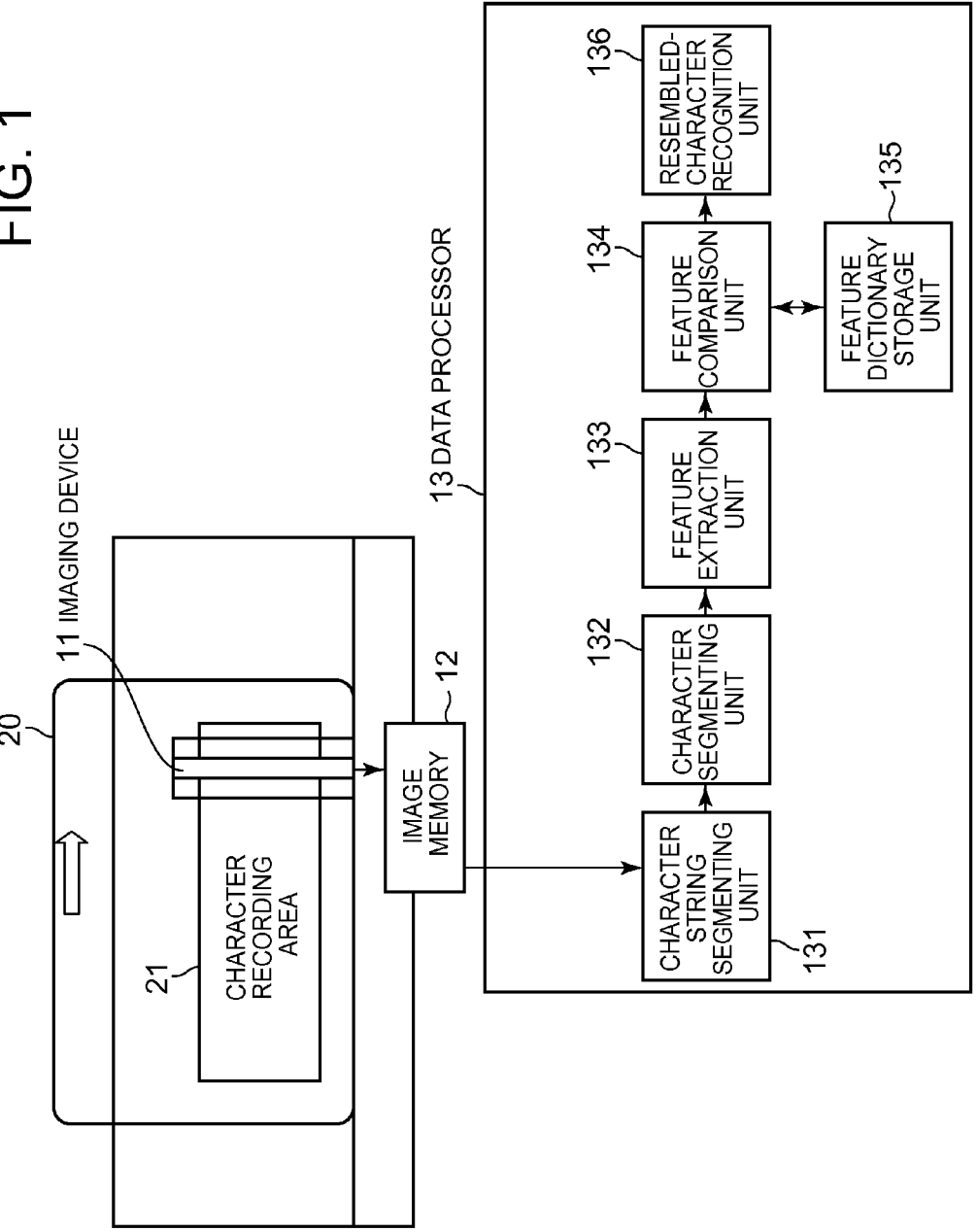
FIG. 1 is a diagram showing a configuration example of a character recognition device of an embodiment of the present invention.

FIG. 1 is a diagram showing a configuration example of a character recognition device of at least an embodiment of the present invention.

A character recognition device 10 of this embodiment has a function which processes the multi-gradation, multi-valued image data, for example, obtained by imaging a character string on a medium such as a paper or a plastic card to segment each character in the character string segmented from the image data.

In a method of detecting (searching for) a position for segmenting a character string in the image captured according to the image recognition technique, the character recognition device 10 sets a processing section containing two characters, which are subjects to the boundary detection process, on the luminance projection calculated on the character string. Then, the character recognition device 10 creates a projection (onto the x axis) within the processing section; for dividing the projection at an arbitrary position into two [areas] of left and right, the device 10 selects a dividing point, at which the within-element variance is the smallest in each division element and the between-element variance is the largest, as the optimal dividing point and takes it as the dividing point (the boundary position) of two characters. For creating a projection in the character segmentation, the character recognition device 10 creates a projection onto the x-axis when characters are arranged in the first direction, which is the transverse, x-direction, and creates a projection onto the y-axis when characters are arranged in the second direction orthogonal to the first direction, that is the longitudinal, y-direction. The projection onto the x-axis is described as an example hereinafter. Note that, in this embodiment, the projection is expressed by pixel values, and an n-bit grayscale image takes multi-values from 1 to (2n−1) gradations.

The character recognition device 10 of this embodiment implements the following characteristic process when searching for (detecting) the position for segmenting a character string in the captured image data based on the image recognition technique. In other words, the character recognition device 10 implements a character segmentation process which detects boundary positions of neighboring characters in the character string and segments each character, a boundary search range setting process which sets ranges to search the boundary positions of neighboring characters in the character string, and a boundary position acquiring process which acquires the boundary positions of characters by using the discrimination analysis method within the set search ranges, to segment each character from the character string segmented from the image data for character recognition.

The character recognition device 10 creates a projection curve in the direction in which the characters in the image data are arranged, based on the smallest luminance value of each pixel line arranged in the direction orthogonal to the direction of the character sting in the image data, and sets boundary search ranges by using the projection curve. In the boundary search setting process, the character recognition device 10 sets a boundary search range from one end of the character string (the left edge on which writing normally starts), sets the boundary position in the boundary search range set by the boundary position setting process, and then sequentially sets the next boundary search range from the previously-set boundary position character by character.

For setting the position for segmenting a character, the character recognition device 10 acquires a character segmentation position by using the discrimination analysis method in the boundary position setting process. More specifically described, the character recognition device 10 divides the projection to the boundary search range "s" which is set associated with the projection curve by a predetermined width into two regions, calculates a within-region variance in each of the two division regions, a between-region variance, and the variance ratio between the within-region variance and the between-region variance, and sets a position for segmenting the character based on the acquired variance ratio.

A more detailed configuration of this character recognition device 10 and the character recognition process function on the captured image will be described hereinafter.

The character recognition device 10 has a contact-type (one dimensional) image sensor 11 as a data input unit, an image memory 12, and a data processor 13. In other words, the character recognition device 10 of this embodiment, as shown in FIG. 1, is a device to recognize a character string printed in a character recording area 21 by processing the image data obtained by capturing a character recording area 21 on an id card (identification card) as a medium, and has the data input unit 11, the image memory 12 as a data storage unit, and the data processor 13. Also, the data processor 13 has a character string segmentation unit 131, a character segmentation unit 132, a feature extraction unit 133, a feature comparison unit 134, a feature dictionary storage unit 135, and a resembled-character recognition unit 136.

The image sensor 11 as the image reader captures a character string printed on the character recording area 21 of the medium 20 and performs a photoelectric conversion on the character string. At the data input unit, the character string printed on the character recording area 21 of the medium 20 such as a card is processed in such a way that the character pattern thereof is captured by the 1 d image sensor as the card is moved along a transfer guide of a medium transfer mechanism and converted photoelectrically and the multi-gradation, multi-valued image data is taken into the image memory 12. The image memory 12 saves (stores) the image data of the character string or the like which is captured by the imaging device 11. The image memory 12 is equipped with a function with which the captured multi-valued image data is taken as a matrix composed of the limited number of pixels and saves the luminance value, a pixel value, of each pixel as readable. The luminance value is expressed by a number within a given range. More specifically described, the luminance values of the 8-bit, 256-gradation multi-valued image data are expressed by integer values from 0 to 255. In this embodiment 1, (m×n) pixels are arranged in a matrix and the multi-valued image data of the entire character recording area 21 is saved over the (m×n) areas. Note that the image memory 12 can take any form such as a ram, a sdram, a ddrsdram, or a rdram as long as the image data can be saved. Further, in this embodiment, the image memory 12 also has a function to binarize the multi-valued image data captured by the data processor 13 and to save the black and white binary image data.

Then, the data processor 13 reads the (multi-valued or binary) image data stored in the image memory 12, implements various processing [on the image data] at each of the above mentioned units, and finally segments each character from the character string on the medium 20 for recognition.

The data input unit captures the character recording area 21 on the medium 20, converts the image into the multi-valued image data and saves it in the image memory 12. In the embodiment 1, as shown in FIG. 1, the medium transfer mechanism which transfers the medium 20 and the contact-type 1d image sensor 11 which captures and reads the character recording area 21 on the medium 20 are equipped. Not that the medium 20 is to be transferred in a predetermined transfer direction t (from the left to the right in FIG. 1) by a transfer means which is not illustrated. In this embodiment, the medium 20 is to be transferred by making one of its edges (the bottom edge in FIG. 1) contact with the transfer guide. The image sensor 11 here uses a contact-type 1d image sensor for the purpose of downsizing the device; however, the image sensor 11 may adopt a 2d area sensor to which a character string of the medium 20 which is a subject to reading is a subject to reading. The image sensor 11 is a line sensor composed of a CCD or the like, in which sensors are arranged in a line in the direction almost orthogonal to the transfer direction t (in the short dimension direction), and formed longer than the width of the character recording area 21 in the short dimension direction, formed on the medium 20, as shown in FIG. 1. Note that, in this embodiment, the analogue image date output from the image sensor 11 is converted to digital image data by an analogue/digital conversion circuit which is connected to the device although not illustrated. More specifically described the analogue image data is converted to 8-bit, 256 gradation, multi-valued image data, for example, and output to the image memory 12. Note that such an analogue/digital conversion circuit itself is known publicly, so its detailed description is omitted here.

Meanwhile, the medium 20 may be a normal card based upon j is such as a plastic card which is 86 mm wide, 54 m tall and 0.76 mm thick, an id card, a passport book or a driver's license.

[Configuration and Function of Each Unit of Data Processor 13]

Next, the basic configuration and function of each unit of the data processor 13 are described. The data processor 13 reads the image data from the image memory 12 and, when the image data is the multi-gradation grayscale image (the multi-valued image), converts it to the back and white binary image. In this embodiment, the data processor 13 also converts the multi-valued image data saved in the image memory 12 into the binary image data. Note that the binarizing process includes acquiring a binary threshold value by a publicly-known proper method, taking the pixels of the multi-valued image data having relatively large luminance values as white elements and the pixels having relatively small luminance values as black elements, and converting them to the black and white binary image data. Thus the binary image data of the entire character recording area 21 is created over the area in which (m×n) pixels are arranged in a matrix.

The character string segmentation unit 131 has a function of binarizing the multi-gradation, multi-valued image data retrieved from the image memory 12. The character string segmentation unit 131 acquires a threshold by a proper method and converts the original multi-valued gray scale image into a black and white binary image. The process in the data processor 13 after this is implemented using the black and white binary image.

By the character string segmentation unit 131, the character string, which is binarized to white and black according to necessity, is projected in the horizontal direction and the top and bottom edges of the character string are detected. Then, by the character string segmentation unit 131, the character string (row) is segmented having recognized the center position between the top and bottom edges as the center line of the character string. Here, the horizontal direction means the first direction in which the characters are arranged crosswise, that is the x direction.

Basically, the vertical position of each character string in the medium is detected by the character string segmentation unit 131. Next, the character segmentation unit 132 searches the segmenting positions of characters which are arranged in the horizontal direction (the x direction) for every character string.

The character segmentation unit 132 of this embodiment detects the segmenting positions of characters in the direction characters are arranged in the character string, which is in the horizontal direction in this embodiment, in the character string segmented by the character string segmentation unit 131, to implement the character segmentation processing. More specifically described, when the segmenting positions in the character string in the captured image are detected (searched), the character segmentation unit 132 of this embodiment sets a processing section which contains two characters which are subject to boundary detecting process on the luminance projection calculated on the character string. Then, the character segmentation unit 132 creates a projection (onto the x-axis) in the processing section; when the projection is divided at an arbitrary position into two regions of left and right, the division point at which the within-element variance is the smallest in each division element and the between-element variance is the largest is selected as an optimal division point and is determined as the division point between the two characters (the boundary position). The character segmentation unit 132 creates the projection onto the x-axis when the characters are arranged in the cross direction, that is in the x-axis direction.

More specifically described, the character segmentation unit 132 implements a character segmentation process in which boundary positions of neighboring characters are detected in the character string and each character is segmented, a boundary of the neighboring characters is set in the character string, and a boundary position acquiring process in which the boundary position of the character is calculated by using a discrimination analysis method within each of the set search ranges.

The character segmentation unit 132 creates a projection curve in the direction in which the characters of the image data are arranged, based on the smallest luminance value of each pixel line arranged in the direction orthogonal to the direction of the character string in the image data, and sets a boundary search range "s" by associating it with the projection curve. The character segmentation unit 132 sets a boundary search range "s" from one edge of the character string (from the left edge in this embodiment), sets a boundary position in the set boundary search range "s", and sets the next boundary search range sequentially from the set boundary position character by character.

The character segmentation unit 132 uses a discrimination analysis method which is described later to acquire a character segmenting position. More specifically described, the character segmentation unit 132 divides the projection to the boundary search range "s", which is set to be associated with the projection curve, by a predetermined width into two regions, and calculates the within-region variance in each of the two division regions, the between-region variance and the variance ratio between the within-region variance and the between-region variance. The character segmentation unit 132, for dividing the projection into two regions of left and right, selects such a division point at which the within-element variance is the smallest in each division element and the between-element variance is the largest, and detects the selected division point as the boundary position of the two characters. More specifically described, the character segmentation unit 132, for dividing the projection into two regions, selects such a division point at which the within-element variance of the projection value is the smallest in each division element and the between-element variance of the projection value is the largest, and detects the selected division point as the boundary position of the two characters. Also, the character segmentation unit 132 divides the projection to the set search range, which is acquired in the direction of the arrangement of the characters, by a predetermined width into two regions, calculates the within-region variance in each of the two division regions and the between-region variance, acquires the variance ratio for every position, and [finally] acquires the position at which the variance ratio is the largest.

Note that the character segmenting process by the character segmentation unit 132 is described in detail later.

When the character segmentation process by the character segmentation unit 132 is finished, the data processor 13 acquires the circumscribed rectangle area (the coordinate values at top, bottom, left and right) of the character which is subject to recognition.

The feature extraction unit 133 divides the circumscribed rectangle area into arbitrary sub regions, that is, divides one circumscribed rectangle area into 5×5 regions, for example, each of which is regarded as a sub region; the ratio of the number of black pixels to the number of the entire pixels is calculated for each sub region, and a feature vector having those elements is created.

The feature comparison unit 134 compares the feature vector acquired by the feature extraction unit 133 with a standard feature vector which has been acquired in advance about all the characters used on this medium and [the vector] having the highest level of resemblance (the normalized correlation, for example) is set as a candidate character to which the character corresponds.

Note that the standard feature vector is stored in advance in the feature dictionary storage unit 135; for the feature comparison, the data of the character having the high level of resemblance is extracted from the feature dictionary storage unit 135 and the feature comparison is implemented at the feature comparison unit 134.

The resembled-character recognition unit 136 basically recognizes the candidate character determined through the feature comparison at the feature comparison unit 134 as the character used on the medium. Note that when there are multiple candidate characters having the resemblance exceeding a predetermined value, character recognition cannot be implemented; therefore, the resembled-character recognition unit 136 implements a resembled-character judgment by using a secondary feature value that can be derived from the feature vector.

For example, the resembled-character recognition unit 136 may be configured to group the arbitrarily-divided sub regions about a left-right line symmetry into two groups of a left half and a right half and compose local feature vectors to study the resemblance between the candidate character and the resembled character, or about a top-bottom line symmetry into two classes of a top half and a bottom half to study their resemblance. Also, the resembled-character recognition unit 136 may be configured to study the similarity bout a point symmetry in the same manner as the left-right line symmetry or the top-bottom line symmetry.

[Detection of Boundary Position (Character Segmenting Position) of Characters]

Next, the character segmenting position detecting process (the character segmentation process) by the character segmentation unit 132 which has a feature function of the character recognition device 10 of this embodiment is described in detail.

[Block Configuration of Character Segmentation Unit 132]

Figure 2:
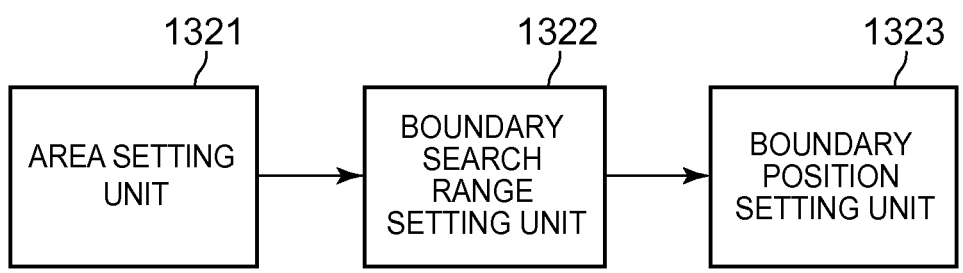
FIG. 2 is a block diagram showing a configuration example of a character segmenting unit of this embodiment.
Figure 3:
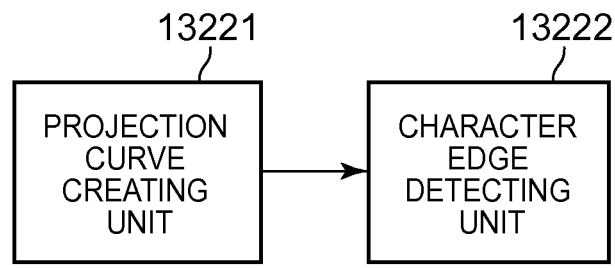
FIG. 3 is a block diagram showing a configuration example of a boundary search range setting unit of FIG. 2.

FIG. 2 is a block diagram showing a configuration example of the character segmentation unit of this embodiment. FIG. 3 is a block diagram showing a configuration example of the boundary search range setting unit of FIG. 2. FIG. 4 is a figure of an example of the image of a subject to character recognition of this embodiment. FIG. 4 shows the example of three character strings. The character string is formed with blank areas between characters. FIG. 5A and FIG. 5B shows an example of a character string in the image of FIG. 4 and an example of the projection curve corresponding to the character string. FIG. 5A shows the magnified character string in the top row of FIG. 4 and FIG. 5B) shows the projection curve Prc.

Note that the character string in the top row of FIG. 4 reads "IDJPN3219876543321987654<<<<<<".

The character segmentation unit 132 of this embodiment, as shown in FIG. 2, is configured including an area setting unit 1321, a boundary search range setting unit 1322 and a boundary position setting unit 1323.

The area setting unit 1321 detects the area on the image occupied by the character string, which has been segmented by the character string segmentation unit 131; when there are multiple character strings, the position of each character string is specified and the area on the image occupied by each character string is set. Note that the area setting unit 1321 is equipped with a character string selecting function for selecting the top character string, for example, in case of three character strings present as shown in FIG. 4.

The boundary search range setting unit 1322 sets a boundary search range "s" within which a boundary position of neighboring characters in the character string is searched. The boundary search range setting unit 1322 creates a projection to the entire length of the character string in the character string area. As described above, the projection onto the x-axis is created when the characters are arranged in the cross direction, that is the x direction, and the projection onto the y-axis is also created when the characters are arranged in the longitudinal direction. The description here is made using the projection onto the x-axis as described above. Also, the subject interval containing two neighboring characters for which the boundary position is to be detected is set as a boundary search range "s".

The boundary search range setting unit 1322 is equipped with a projection curve creating unit 13221 and a character edge detecting unit 13222 as shown in FIG. 3.

As shown in FIG. 5A and FIG. 5B, the projection curve creating unit 13221 detects the smallest luminance value in the luminance values stored in the pixel lines arranged in the direction orthogonal to the direction of the character string in the image data, and creates a minimum luminance curve which is the projection curve of the image data, based on the smallest value of each pixel line. Over the character image area in the image data of the captured character string, the projection curve creating unit 13221 acquires the minimum luminance curve by repeating the operation of acquiring the smallest luminance values by scanning the pixel lines in the direction orthogonal to the character string, from the luminance line on the left edge of the character image area to the luminance line on the right edge.

Thus, the projection curve creating unit 13221 uses the smallest values of the pixels arranged in the direction perpendicular to the x-axis. Note that the projection often uses the mean value of the pixel group arranged in the direction perpendicular to the x-axis; however, the case of this embodiment is also defined as a projection for convenience. By taking the smallest values, the fluctuation of the profile caused by the difference in the character heights can be prevented. Also, the projection is represented by the pixel values and takes multi-values from 0 to 255 gradations since this is an 8-bit grayscale image. Among the character stings shown in FIG. 4, for example, the projection curve (the minimum luminance curve) Prc of the top character string shown in FIG. 5A is the one as shown in FIG. 5B. In this minimum luminance curve (the projection curve) Prc, the interval of the peak mc in the curve indicates a character (black=dark) while the portion of the valley vc in the curve indicates a space between characters (white=light in the image).

Figure 6:
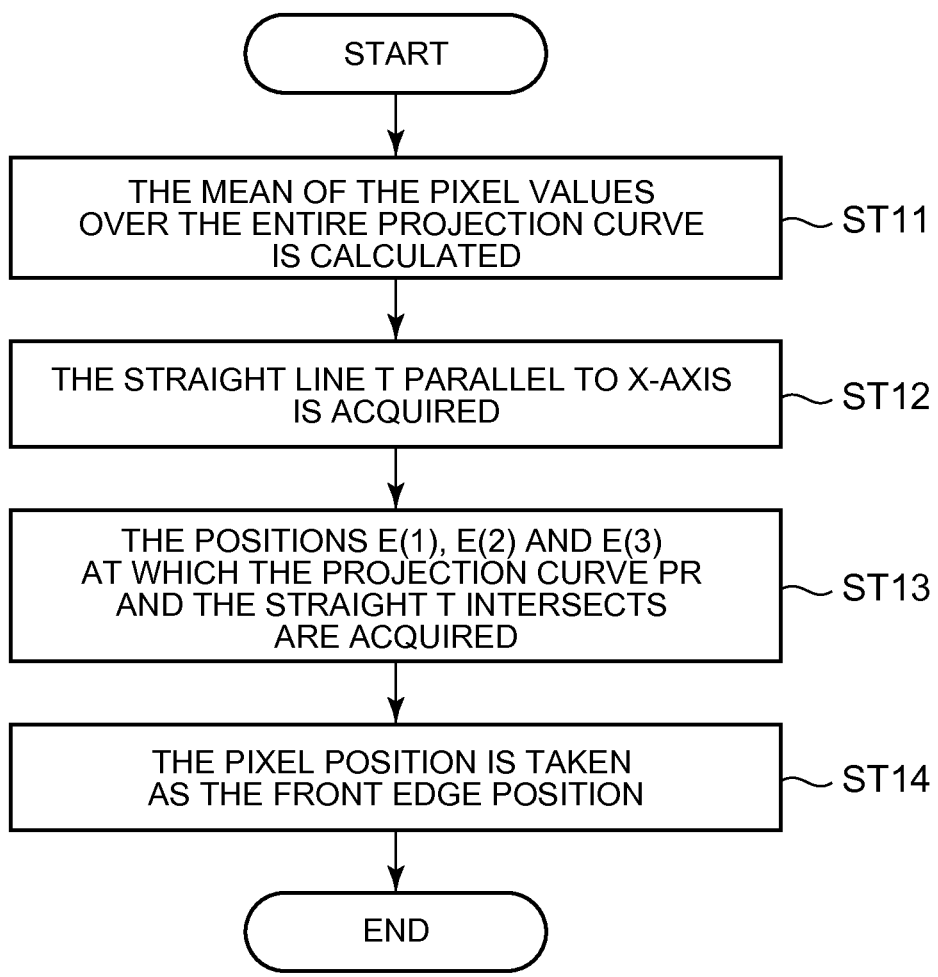
FIG. 6 is a flowchart of a process of detecting the character edges by a character edge detecting unit of this embodiment.
Figure 7A:
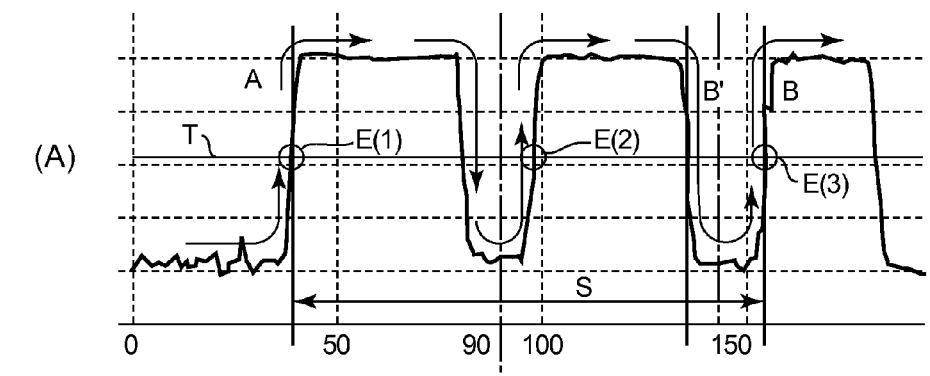
FIGS. 7A and 7B are charts to explain the process of detecting the character edges by the character edge detecting unit of this embodiment.
Figure 7B:
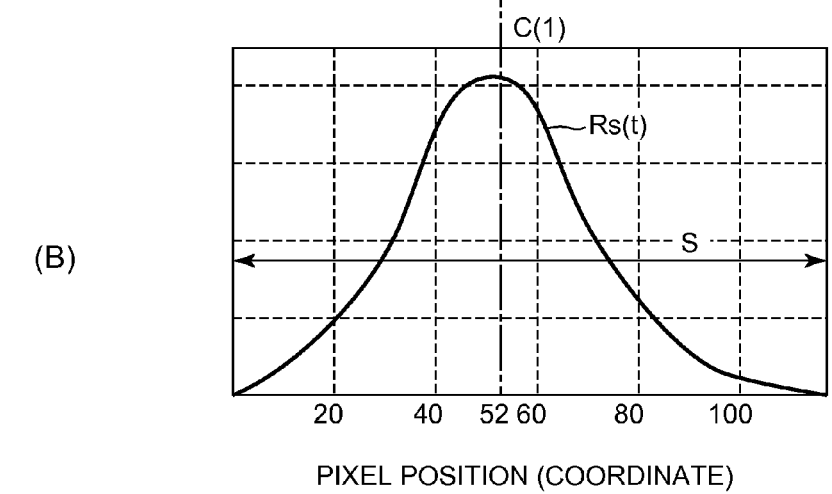

The character edge detecting unit 13222 detects the pixel position of the edge of each character from the minimum luminance curve (the projection curve) Prc. Note that, in this embodiment, the front edge position of the character is detected as the character edge. FIG. 6 is a flowchart showing the process of detecting character edges by the character edge detecting unit of this embodiment. FIG. 7A and FIG. 7B show charts to explain the process of detecting the character edges by the character edge detecting unit of this embodiment diagram. FIG. 7A shows the first three characters from the left in the character string on the projection curve Prc shown in FIG. 5B. FIG. 7B shows, as the boundary search range "s" on the projection curve divided into two regions (classes), the characteristic curve rs(t) of the variance ratio between the within-region (-class) variance and the between-region (-class) variance. In FIG. 7A, the horizontal axis indicates the pixel position information (coordinate) in the x-axis direction (the horizontal direction) of the image and the vertical axis indicates it luminance value. The character edge detecting process by the character edge detecting unit 13222 of this embodiment follows the steps below (each step in FIG. 6).

Step ST11: the mean value of the pixel values over the entire minimum luminance curve (the projection curve) Prc is acquired.

Step ST12: as a result, the straight line t parallel to the x-axis can be acquired as shown in FIG. 7A.

Step ST13: The minimum luminance curve (the projection curve) Prc is scanned from the left to acquire a predetermined number of the pixel positions crossing (intersecting) the straight line t from the bottom to the top, which are the first three positions e(1), e(2) and e(3) in this embodiment.

Step ST14: These pixel positions are of the front edges of the characters. The coordinate position is set to e(1:ne) where ne indicates the number of the pixel positions crossing the straight line t from the bottom to the top. In other words, since these pixel positions are regarded as the front edge positions of the characters, the entire number ne is equal to the number of characters.

The character edge detecting unit 13222 sets a boundary search range "s" containing two neighboring characters for which the boundary position is to be detected. Having the boundary search range "s" set, the next boundary search range "s" can be determined by adding the number of the pixels for the two neighboring characters to the calculated boundary position, without scanning the minimum luminance curve (the projection curve) Prc from the left to acquire all the pixel positions crossing the straight line t from the bottom to the top. While adding the boundary search range "s" to the calculated boundary position c(n−1), the character edge detecting unit 13222 determines the boundary search range to calculate the boundary position c<n> of the next character.

Next, the detection of the boundary position in this embodiment is described referring to FIG. 7A and FIG. 7B. As described above, FIG. 7A and FIG. 7B show the first three characters from the left in the character string on the projection curve (the minimum luminance curve) shown in FIG. 5B. As shown in FIG. 5A, the three characters from the left edge of the character string of this example are "IDJ". First detected is the boundary position c(1) existing between the first character ("i" in this example) and the second character ("d" in this example).

The character edge detecting unit 13222 determines a boundary search range "s" that is used for boundary search in the minimum luminance curve (the projection curve) in the following manner. In FIG. 7A, there are three of the above-described character edge positions. Of them, the first character front edge position a and the third character front edge position b are set as the starting point and the ending point of the boundary search range "s". The more desirable ending point of the boundary search range "s" would be the position b' (the point crossing the straight line t from the top to the bottom) rather than b in the figure because "the bottom of the valley" of the minimum luminance curve (the projection curve) Prc is positioned almost in the center of the search range; however, the point b is used since it does not affect the search process. In FIG. 7 (*a*), the pixel position in the x-axis direction is (a, b)=(39, 155).

Returning to the description of FIG. 2, when the projection to the portion in which the boundary search range "s" is set is divided at an arbitrary position into two classes of left and right, the boundary position setting unit (the boundary position calculating unit) 1323 selects the boundary point, at which the within-division element variance of the projection value is the smallest in each class and the between-division element variance of the projection value is the largest, as the optimal boundary point. In other words, this boundary point is the boundary position of the two neighboring characters.

The character segmenting unit 132 implements the above-described processes to calculate the boundary position for each character and segment all the characters composing the character string.

For the character segmentation, the boundary position setting unit 1323 implements the boundary position acquiring process to acquire a boundary position of [neighboring] characters by using a discriminant analysis method within the set boundary search range "s" and segments every character in this way from the character string segmented from the image data.

The boundary position setting unit 1323 divides the projection to the set boundary search range "s" at a predetermined width into two regions and calculates the within-region variance in each division element, the between-class variance and the variance ratio between the within-class variance and the between-class variance. When the projection is divided into two elements of left and right, the boundary position setting unit 1323 selects the division point at which the within-element variance is the smallest in each element and the between-element variance is the largest, and detects the selected point as the boundary position (the division position) of the two [neighboring] characters. Then, the boundary position setting unit 1323 acquires the position at which the calculated variance ratio is the largest. In other words, the boundary position setting unit 1323, dividing the created projection into two elements of left and right, selects the division point at which division element (the within-division region) variance of the projection value in each division element (each division region) is the smallest and the between-division element (the between-division region) variance of the projection value is the largest, and detects the selected point as the boundary position (the division position) of the two neighboring characters. In the division point calculating process, the boundary position setting unit 1323 divides the projection of a predetermined width to the boundary search range "s", which is taken from one position to the next in the direction the characters are arranged, into two regions, calculates the within-division region variance in each projection and the between-division region variance, calculates the variance ratio for every position and acquires the position at which the variance ratio is the largest.

[More Concrete Example of the Character Segmentation Process of this Embodiment]

An example of a more concrete process by the character segmenting unit 132 of this embodiment is described hereinafter referring to the figures from FIG. 4 to FIG. 10. The boundary position setting unit 1323 is described in more detail in the description below.

Figure 8:
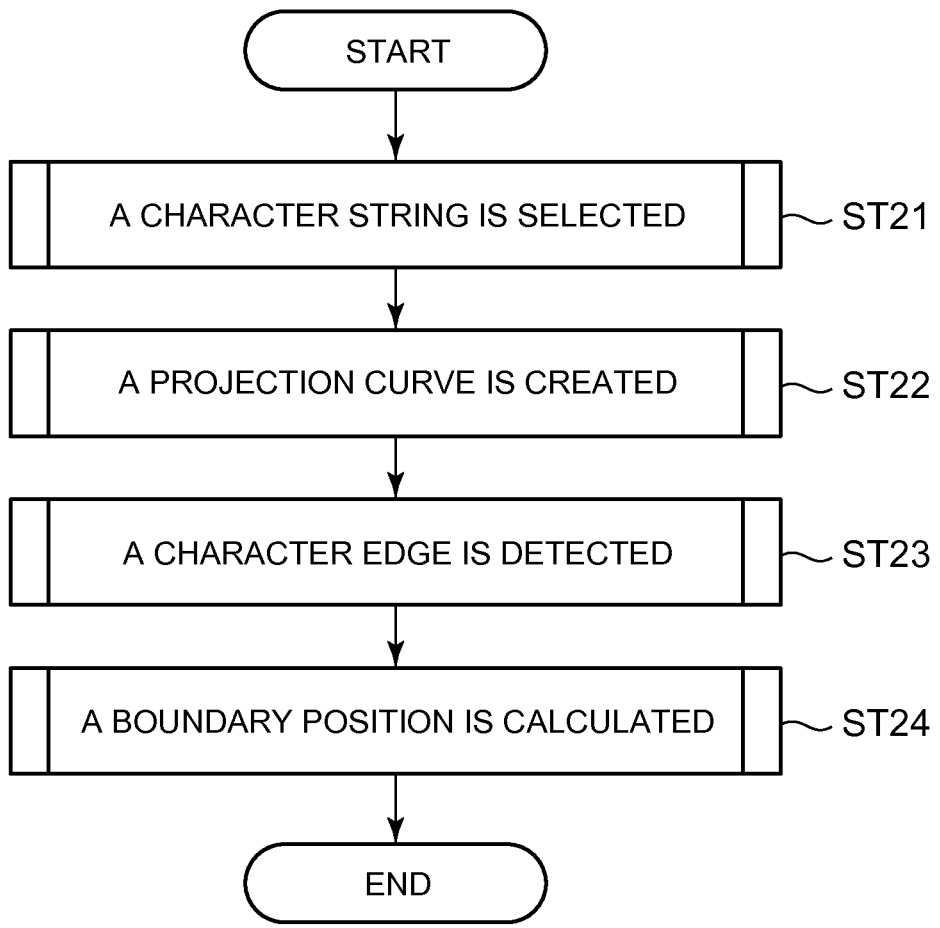
FIG. 8 is a flowchart showing a summary of the process by the character segmenting unit of this embodiment.
Figure 9:
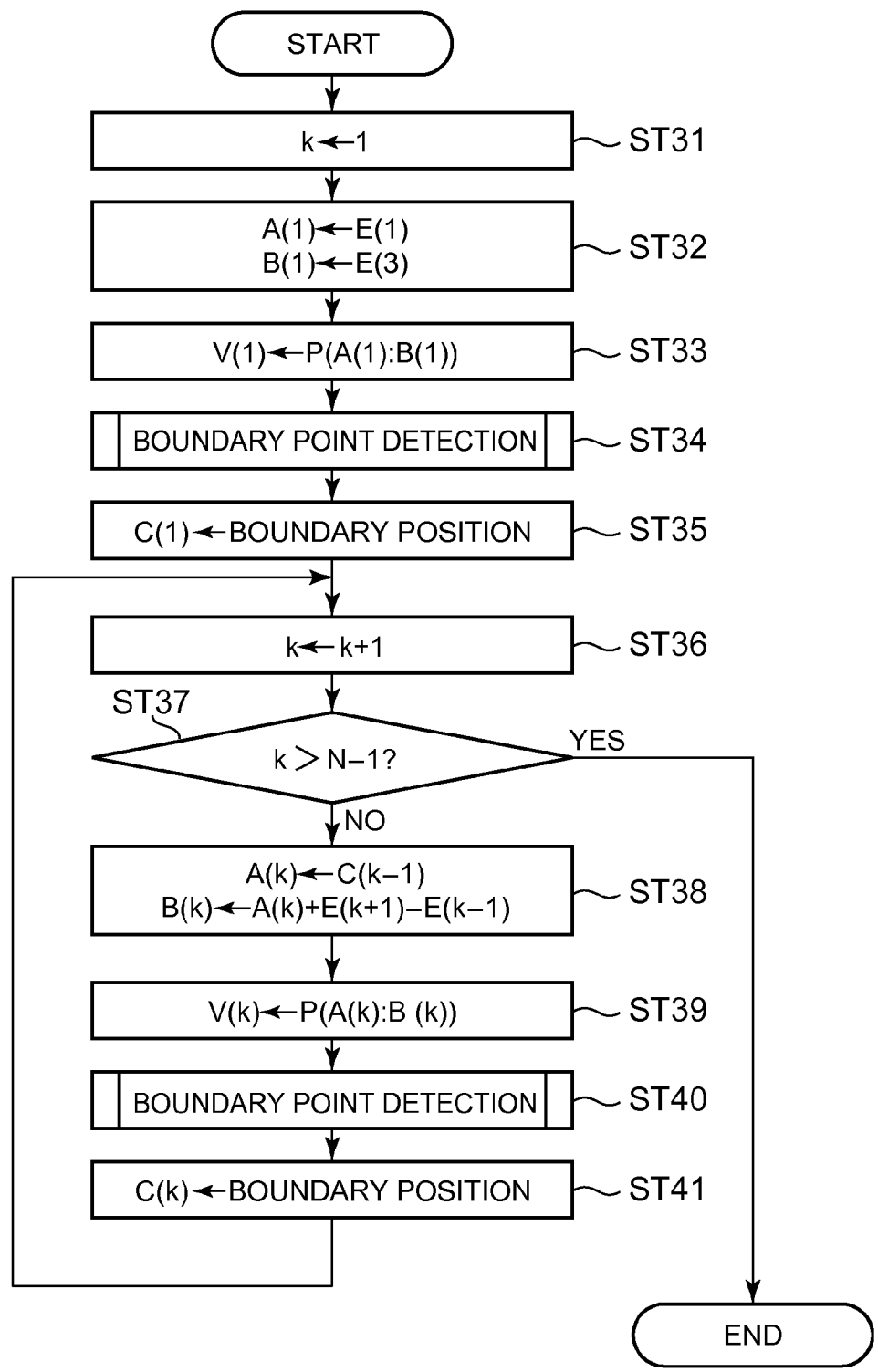
FIG. 9 is a flowchart showing a process flow by the boundary position setting unit in the character segmenting unit of this embodiment.
Figure 10:
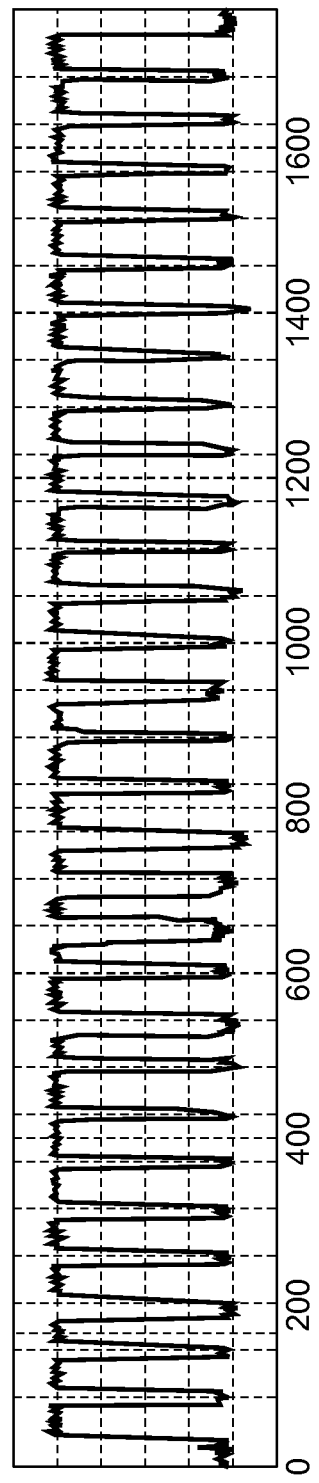
FIG. 10 is a chart showing a result of detecting the character boundary points in the entire character string by the boundary position setting unit in the character segmenting unit of this embodiment.

Note that FIG. 8 is a flowchart of the outline of the process at the character segmentation unit of this embodiment. FIG. 9 is a flowchart of the process flow of the boundary position setting unit of the character segmenting unit of this embodiment. FIG. 10 shows the result of detections of the character boundary points of the entire character string by the boundary position setting unit of the character segmenting unit of this embodiment.

Suppose that the image which is a subject to character recognition is one as shown in FIG. 4. At the character segmenting unit 132, the area is first set. In the area setting process, a rectangular area including the entire character string which is a subject to character recognition is set. This corresponds to the character recording area 21 in FIG. 1. The character recording area 21 is defined in advance by a standard about the surface information of the medium. If the position of the character area is unknown, however, the position of the character string in the vertical direction may be defined by a proper method and then the positions of the top side and the bottom side of the rectangular area may be determined based on the information. The width of the rectangular area can be determined based on the standard position information when the position of the character string is fixed. When the horizontal direction of the character string is not fixed, the horizontal position of the character string may be determined by a proper method and, based on this information, the positions of the left side and right side of the rectangular area may be determined. It is preferred to provide an appropriate blank space from the edge position of the actual character, considering errors in the character position.

In the character string segmentation process, a character string segmentation is implemented. Note that the process may take a step of directly detecting the position of a character string without setting the entire character area. FIG. 5A shows the segmented top character string in FIG. 4.

The character segmentation process is implemented following the flowchart shown in FIG. 8. Basically the character segmenting unit 132 detects (searches for) character segmenting positions in the horizontal direction for the character string line.

[Detection of Character Segmenting Position in this Embodiment]

At the character segmenting unit 132 shown in FIG. 1, the area setting unit 1321 sets the area on the image, occupied by the character string which has been segmented by the character string segmentation unit 131 in Step ST21. When there are multiple character strings, the position of each character string is specified and the area on the image occupied by each character string is set. Next, in Step ST22, the smallest luminance value is detected by the projection curve creating unit 13221 of the boundary search range setting unit 1322 from the luminance values stored in the pixel lines arranged in the direction orthogonal to the character string in the image data, and the minimum luminance curve, which is the projection curve in the image data, is created based on the smallest luminance value of each pixel line. In Step ST23, a boundary search range "s", containing two neighboring characters for which the boundary position is to be detected, is set by the character edge detecting unit 13222; with the boundary search range "s" set, the minimum luminance curve (the projection curve) Prc is scanned from the left to detect the pixel position of the portion of the character. In Step ST24, when the projection to the area in which the boundary search range "s" is set is divided at an arbitrary position into two classes of left and right, the boundary point, at which the within-division element variance of the projection value is the smallest value in each class and the between-division element variance of the projection value is the largest, is selected as the optimal boundary point by the boundary position setting unit 1323. In other words, this boundary point is set as the boundary position of the two neighboring characters.

By adopting [the functions of] this character segmenting unit 132, the character segmentation is made possible without being affected by the level of the threshold or even when a threshold cannot be acquired due to a local illegibility of character. Thus, even when a character is locally illegible, the boundary position can be detected with certainty. In other words, because of the character segmenting unit 132, the boundary position of characters can be determined with high accuracy regardless of the condition of the character boundary portion, without a threshold, which normally affects the performance; thus, the character recognition performance can be improved.

Another concrete process at the boundary position setting unit 1323 is described next. As described previously, the feature of this embodiment is that a boundary position between characters can be detected without using a threshold. Its concrete method (the process by the boundary position setting unit) is described. The method described here uses the minimum luminance curve (the projection curve) "v=p(a:b)" within the boundary search range "s" to detect the "valley point" which indicates a blank space between characters (white=light in the image). The process below corresponds to the process of Step ST31 through ST35 of FIG. 9.

The projection p(i) is to be expressed where i=1:n. N indicates the width of the boundary search range "s", and "i=1:n" means that "i" changes from 1 (i.e., the point a in FIG. 7(a)) to n (the point b). Having a variable t (1<t<n) introduced, the projection p(i), when i=t, is divided into two elements (regions) of "p1=(1:t)" and "p2=p(t+1:n)" which are the class cls1 and the class cls2. The mean value m1 in the class cls1 and the mean value m2 in the class cls2 can be acquired by the following formula.

$$m1 = \frac{\sum_{i=1}^{t} p(i)*i}{\sum_{i=1}^{t} p(i)}, m2 = \frac{\sum_{i=t+1}^{N} p(i)*i}{\sum_{i=t+1}^{N} p(i)} \quad [\text{formula 1}]$$

Also, the overall mean value mt can be acquired by the following formula.

$$mt = \frac{m1 * \sum_{i=1}^{t} p(i) + m2 * \sum_{i=t+1}^{N} p(i)}{\sum_{i=1}^{N} p(i)} \quad [\text{formula 2}]$$

Therefore, the within-class variance sw can be given by the following formula.

$$sw(t) = \sum_{i=1}^{t} p(i)*(i-m1)^2 + \sum_{i=1+1}^{N} p(i)*(i-m2)^2 \quad [\text{formula 3}]$$

The between-class variance sb can be given by the following formula.

$$sb(t) = \sum_{i=1}^{t} p(i)*(m1-mt)^2 + \sum_{i=t+1}^{N} p(i)*(m2-mt)^2 \quad [\text{formula 4}]$$

Then, the variance ratio rs(t) is acquired as follows.

$$Rs(t)=sb(t)/sw(t) \quad [\text{formula 5}]$$

After all these calculations, the value of the parameter of the position 't' that gives the largest variance ratio rs(t) is calculated. In other words, the projection is divided into two regions having the projection 'p(i)' where 'i=t' as a threshold, and the within-division region variance in each projection and the between-division region variance are calculated while changing the value of 't' to acquire the variance ratio with each 't', and finally the value of 't' at which the variance ratio becomes the largest is acquired.

FIG. 7B shows the curve rs(t) within the boundary search range "s" of FIG. 7A. In FIG. 7B, the variance ratio rs(t) is the largest at 't=52', and the boundary position c(1) to detect is given as follows.

$$c(1)=a+t-1=39+52-1=90 \quad [\text{formula 6}]$$

The method using the variance ratio of these two classes can be called a discriminant analysis method. Although this discriminant analysis method is adopted in this embodiment, it uses a data retrieval different from a general discriminant analysis method. In other words, in the discriminant analysis method of this embodiment, the projection to the set boundary search range "s" is divided by a predetermined width into two regions, and the within-region variance in each of the two division regions, the between-region variance and the variance ratio between the within-region variance and the between-region variance are respectively calculated. In other words, the projection to the boundary search range "s" is divided by a predetermined width into two regions; the within-region variance in each of the two division regions, the between-region variance and the variance ratio between the within-region variance and the between-region variance are respectively calculated; the position at which the obtained variance ratio is the largest is found. The area containing the point at which the variance ratio is the largest corresponds to the area containing the region at which the mean pixel value of the row is the lowest in the mean pixel value distribution of the entire pixel values arranged in the y direction of the projection.

Thus, in the discriminant analysis process in this embodiment, the local discrimination information on individual characters for every string can be obtained with high precision and the boundary positions of characters can be determined with high accuracy. In other words, by adopting the discriminant analysis method of this embodiment to the boundary position setting process (the searching process), the boundary positions of characters can be determined with high precision regardless of clarity of boundaries without performing a complicated thresholding process. The discriminant analysis method of this embodiment is an application in the area irrelevant to threshold that binarizes the grayscale image.

As for the second or later boundary position c (2:ne−1) (corresponding to Steps ST36 though ST41 in FIG. 9), the boundary search range "s" is set in the following manner to detect the k-th boundary position c(k), for example.

$$a(k)=c(k-1)$$

$$b(k)=a(k)+e(k+1)-e(k-1) \quad \text{[formula 7]}$$

Then, the partial projection v(k)=p(a(k):b(k)) is input to a boundary point detection routine (step st40) to acquire the boundary position c(k). This process is repeated while incrementing k and completes when k exceeds (ne−1).

FIG. 10 shows the result of the detections of the character boundary points of the entire character string.

[General Operation of Character Recognition Device]

Figure 11:
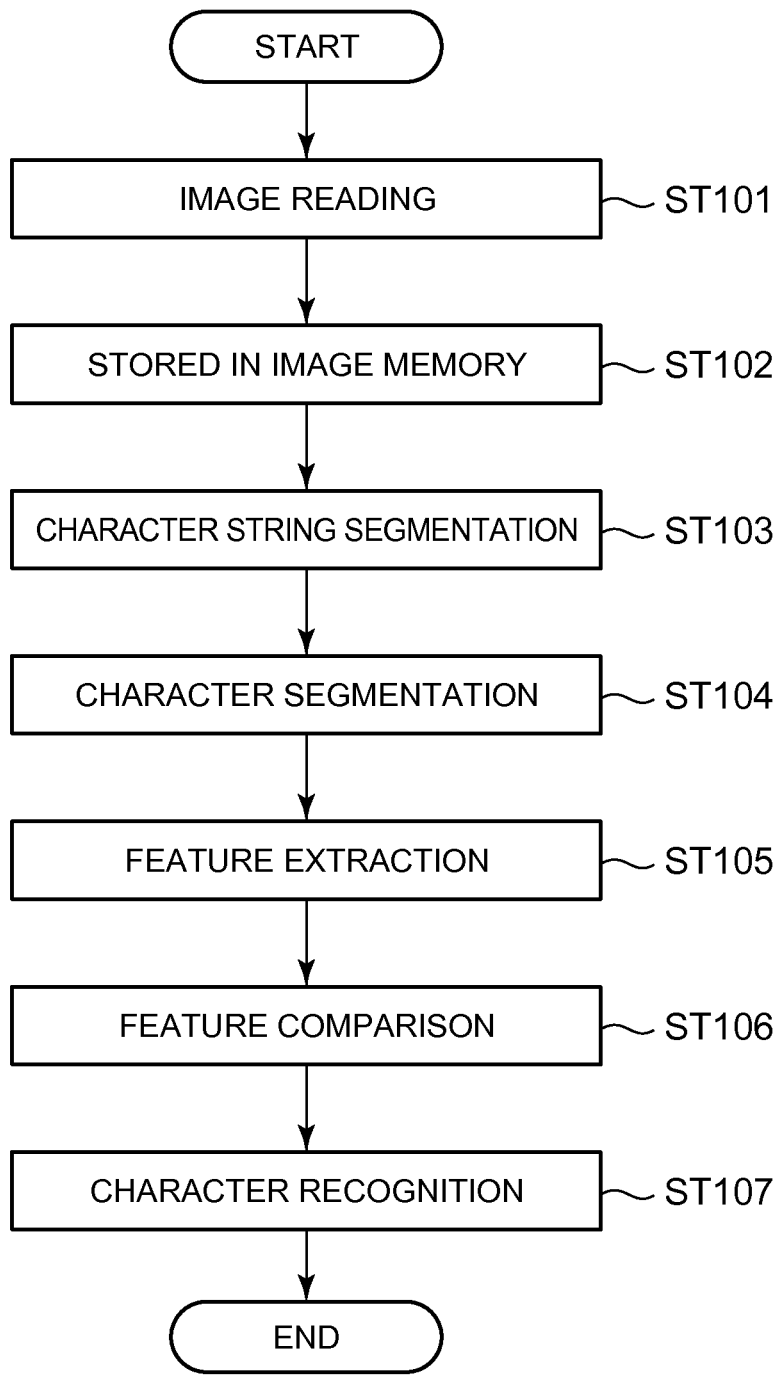
FIG. 11 is a flowchart to explain the operation of the character recognition device of this embodiment.

The general operation of the character recognition device 10 of this embodiment is described associated with FIG. 11. FIG. 11 is a flowchart to explain the entire operation of the character recognition device 10 of this embodiment.

A character string printed in the character recording area 21 of the medium 20 such as a card is scanned, as the card is moved along a transfer guide of a medium transfer mechanism, by a 1d image sensor and its character pattern is read and given photoelectric conversion (Step ST101); then, the multi-valued image of the multi-gradation and 256 grayscales, for example, is taken into the image memory 12 (Step ST102).

Next, a character string segmentation is implemented by the character string segmenting unit 131 (Step ST103). More specifically described, at the character string segmenting section 131, a character string which is binarized according to necessity is projected in the horizontal direction and the top and bottom edges of the character string are detected. At the character string segmenting section 131, the center position of the top and bottom edges is identified as the center line of the character string and then the line is segmented.

Note that, at the character string segmenting unit 131, the multi-valued image stored in the image memory 12 is binarized as a black and white binary image according to necessity. More specifically, in the data processor 13, the image data is read from the image memory 12; when the image data is the multi-gradation grayscale image, the grayscale image is converted to a black and white binary image.

Then, at the character segmenting section 132, a character segmentation is implemented (Step ST104). More specifically described, the character segmentation unit 132 detects the area on the image occupied by the character string which has been segmented by the character string segmenting unit 131; when there are multiple character strings, the position of each character string is specified and then, the area on the image occupied by each character string is set.

At the character segmenting section 132, the smallest luminance values are then detected from the luminance values stored in the pixel lines arranged in the direction orthogonal to the direction of the character string in the image data, and the minimum luminance curve, which is the projection curve within the image data, is created based on the smallest luminance value of each pixel line. Next, at the character segmenting section 132, a boundary search range "s" containing two neighboring characters for which a boundary position is to be detected is set; with the boundary search range "s" set, the minimum luminance curve (projection curve) Prc is scanned from the left, (the boundary position of the two neighboring characters is acquired), and the pixel position of each character is detected. Then, at the character segmenting unit 132, the projection to the area in which the boundary search range "s" is set is divided at an arbitrary position into two classes of left and right, and the boundary point at which the within-division element variance of the projection value is the smallest in each class and the between-division element variance of the projection value is the largest is selected as the optimal boundary point. This boundary point is regarded as the boundary position between the two neighboring characters.

When the process of Step ST104 is completed, the bounding rectangle area (the coordinate values at top, bottom, left and right) of the character which is a subject for recognition is obtained.

Next, a feature extraction is implemented by the feature extraction unit 133 (step st105). More specifically described, in the feature extraction unit 133, the above-mentioned bounding rectangle area is divided into arbitrary sub regions (for example, one bounding rectangle area is divided into 5×5 areas, each of which is a sub region); in each sub region, the ratio of the number of the black pixels to the number of the all pixels in the sub region is obtained; and a feature vector having those ratios as the elements is created.

Next, a feature comparison is implemented by the feature comparison unit 134 (Step ST105). More specifically described, in the feature comparison unit 134, the feature vector obtained in step st105 is compared with standard feature vectors, which are prepared in advance for all the characters used in this medium and stored in advance in a feature dictionary storage section 135, and the character having the highest level of resemblance (the normal correlation coefficient, for example) is set as a candidate character.

Finally, a character recognition is implemented (Step STt107). More specifically described, the candidate character which has been identified in the feature comparison in Step ST106 is recognized as the character that is used in the medium. Note that when there are multiple candidate characters whose resemblance exceeds a certain value, the character cannot be recognized; therefore, in the resembled-character recognition unit 136, the secondary feature amount derived from the feature vector is used to make judgment on the resembled characters.

For example, the resembled-character recognition unit 136 may be configured to group the arbitrarily-divided sub regions by a left-right line symmetry into a left half group and a right half group and compose a local feature vector to study the resemblance between the candidate character and the resembled character, or by a top-bottom line symmetry into a top half group and a bottom half group to study the resemblance between the candidate character and the resembled character. Also, the resembled-character recognition unit 136 may be configured to study the resemblance by a point symmetry in the same manner as the left-right line symmetry or the top-bottom line symmetry.

[Major Effects of Embodiment]

As described above, according to this embodiment, in the method for detecting (searching for) the position to segment a character string in the scanned image based on the image recognition technique, a processing section including two characters, which are subject to the boundary detection process, is set in the luminance projection which is calculated on the character string. Then, a projection (onto the x-axis) within the processing section is created; when the projection is divided at an arbitrary position into left and right, the division point at which the within-element variance is the smallest in each division element and the between-element variance is the largest is selected as the optimal division point; the point is taken as the division point (a boundary position) between the two neighboring characters. Consequently, according to this embodiment, such a character recognition device can be provided so that the character segmentation is made possible without being affected by the level of threshold and even when a threshold cannot be acquired due to partial illegibility of the characters, as well as a character segmenting method for the character recognition device which can segment characters with certainty even when a threshold cannot be obtained. In other words, according to this embodiment, the boundary positions of characters can be determined without setting a threshold based on the level value of the projection curve; therefore, without implementing a complicated thresholding process, a boundary line can be set for characters whose boundary is unclear.

Also, even when the projection curve has fluctuations locally due to a local noise in the image, the boundary positions of characters can stably be determined.

According to this embodiment, the projection curve composed of the minimum luminance curve is adopted; therefore, a character interval and a space interval are clearly separated from each other and a character segmenting position can be more accurately determined. Further, according to this embodiment, without setting a threshold which affects the performance of character recognition, boundary positions of characters can be determined with high accuracy no matter what condition the character boundary portions are in, thus improving the character recognition performance.

In other words, according to this embodiment, without setting a threshold which affects the performance and regardless of the condition of the character boundary portions, local discriminant information can be obtained with high precision, enabling determination of the boundary positions of characters with high accuracy. Consequently, the discriminant information can be acquired locally with high precision, without implementing a complicated thresholding process, thus making it possible to determine the boundary positions of characters with high accuracy.

Also, according to this embodiment, the same effect can be obtained even when this method is applied to a case in which the boundaries of characters are clear.

This invention is applicable to data demodulation which is done based on the reproduction output waveform of magnetic stripes. Also, the character recognition device 10 of this embodiment is applicable not only to cards, but also to various media such as passports, driver's licenses, etc.

Note that the method described in detail above can be configured as a program following the above steps, which is executed by a computer such as a cpu. Also, such a program can be configured to be executed by a recording medium such as a semiconductor memory, a magnetic disk, an optical disk or a floppy (registered trademark) disk and accessed through a computer having the medium.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A character recognition device for use with a medium on which a character string is printed, the character recognition device comprising:
    an image reader structured to capture the character string on the medium as image data;
    an image memory structured to store the image which is read by said image reader; and
    a data processor structured to segment the character string from said image data stored in said image memory and segmenting characters from said character string for character recognition;
    wherein said data processor comprises:
        a character segmenting unit structured to detect boundary positions of neighboring characters in said character string and segment each character; and
    said character segmenting unit comprises:
        a boundary search range setting unit structured to set a range to search boundary position of neighboring characters in said character string and
        a boundary position setting unit structured to set a boundary position of characters by using a discriminant analysis method within said search range which has been set; and
    said boundary position setting unit is structured to divide a projection to said boundary search range by a predetermined width into two regions, calculate the within-region variance in each region, the between-region variance, and the variance ratio between the within-region variance and the between-region variance, and set a segmentation position of characters based on said calculated variance ratio.

2. The character recognition device as set forth in claim 1 wherein
    said character segmenting unit comprises a projection curve creating unit which, based on the smallest luminance value of each pixel line arranged in the direction orthogonal to said character string in said image data, is structured to create a projection curve in said image data, and
    said boundary search range setting unit is structured to set said boundary search range by associating it with said projection curve.

3. The character recognition device as set forth in claim 1, wherein
    said boundary search range setting unit sets said boundary search range from one end of said character string, and as a boundary position is set within said set boundary search range by said boundary position setting unit, a next boundary search range is set from said set boundary position; and said boundary position setting unit sets a boundary position for every boundary search range which is set sequentially.

4. A character segmenting method, in a character recognition device for recognizing characters by segmenting each character from a character string which is segmented from image data acquired by capturing a character string on a medium, for processing said image data to segment each character from said character string; the method comprising:
   detecting a boundary position of neighboring characters in said character string and segmenting each character;
   setting a range to search a boundary position of neighboring characters in said character string; and
   acquiring a boundary position of characters by using a discriminant analysis method within said set search range;
   wherein, in said acquiring a boundary position, a projection to said boundary search range is divided by a predetermined width into two regions; the within-region variance in each of two division regions, the between-region variance and the variance ratio between the within-region variance and the between-region variance are calculated; and the position to segment a character is set based on said calculated variance ratio.

5. The character segmenting method as set forth in claim 4 wherein
   said segmenting comprises detecting a smallest luminance value in each pixel line arranged in the direction orthogonal to the direction of said character string in said image data and creating a projection curve within said image data based on said smallest luminance value of each pixel line; and
   said setting a range sets said boundary search range by associating it with said projection curve.

6. The character segmenting method for a character recognition device, which is set forth in claim 4, wherein:
   in said boundary search range setting step, said boundary search range is set from one end of said character string, and as a boundary position is set within said set boundary search range by said boundary position setting unit, a next boundary search range is set from said set boundary position;
   in said boundary position setting step, a boundary position is set for every character according to said boundary search range which is set sequentially.

* * * * *